US008761412B2

(12) United States Patent
Hernandez-Abrego et al.

(10) Patent No.: US 8,761,412 B2
(45) Date of Patent: Jun. 24, 2014

(54) MICROPHONE ARRAY STEERING WITH IMAGE-BASED SOURCE LOCATION

(75) Inventors: Gustavo Hernandez-Abrego, Mountain View, CA (US); Eric Larsen, Pacifica, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 289 days.

(21) Appl. No.: 12/969,896

(22) Filed: Dec. 16, 2010

(65) Prior Publication Data

US 2012/0155703 A1 Jun. 21, 2012

(51) Int. Cl.
*H04R 3/00* (2006.01)

(52) U.S. Cl.
USPC ............ 381/92; 381/56; 382/103; 348/231.4; 348/169; 348/170

(58) Field of Classification Search
USPC .................... 381/92, 122, 56–58; 382/103; 348/231.4, 169–170
See application file for complete search history.

(56) References Cited

U.S. PATENT DOCUMENTS

| | | | |
|---|---|---|---|
| 4,787,051 A | 11/1988 | Olson | |
| 4,843,568 A | 6/1989 | Krueger | |
| 5,128,671 A | 7/1992 | Thomas, Jr. | |
| 5,388,059 A | 2/1995 | DeMenthon | |
| 5,528,265 A | 6/1996 | Harrison | |
| 6,009,396 A | 12/1999 | Nagata | |
| 6,144,367 A | 11/2000 | Berstis | |
| 6,157,368 A | 12/2000 | Faeger | |
| 6,375,572 B1 | 4/2002 | Masuyama et al. | |
| 6,720,949 B1 | 4/2004 | Pryor et al. | |
| 7,038,661 B2 | 5/2006 | Wilson et al. | |
| 7,489,299 B2 | 2/2009 | Liberty et al. | |
| 7,627,139 B2 * | 12/2009 | Marks et al. | 382/103 |
| 7,874,917 B2 | 1/2011 | Marks et al. | |
| 7,918,733 B2 | 4/2011 | Zalewski et al. | |
| 8,139,793 B2 | 3/2012 | Mao | |
| 2002/0085097 A1 | 7/2002 | Colmenarez et al. | |
| 2003/0193572 A1 | 10/2003 | Wilson et al. | |
| 2004/0212589 A1 | 10/2004 | Hall et al. | |
| 2006/0104454 A1 * | 5/2006 | Guitarte Perez et al. | 381/71.6 |
| 2006/0204012 A1 * | 9/2006 | Marks et al. | 381/26 |
| 2006/0239471 A1 | 10/2006 | Mao et al. | |

(Continued)

OTHER PUBLICATIONS

Van Trees, "Optimum Array Processing (Detection, Estimation, and Modulation Theory, Part IV)," Chapter 6.13 "Broadband Beamformers," pp. 621-667.

(Continued)

*Primary Examiner* — Disler Paul

(74) *Attorney, Agent, or Firm* — Blakely, Sokoloff, Taylor & Zafman LLP

(57) ABSTRACT

Methods and systems for beam forming an audio signal based on a location of an object relative to the listening device, the location being determined from positional data deduced from an optical image including the object. In an embodiment, an object's position is tracked based on video images of the object and the audio signal received from a microphone array located at a fixed position is filtered based on the tracked object position. Beam forming techniques may be applied to emphasize portions of an audio signal associated with sources near the object.

17 Claims, 10 Drawing Sheets

(56) References Cited

U.S. PATENT DOCUMENTS

| | | | |
|---|---|---|---|
| 2006/0252541 A1 | 11/2006 | Zalewski et al. | |
| 2006/0274032 A1 | 12/2006 | Mao et al. | |
| 2006/0280312 A1 | 12/2006 | Mao | |
| 2006/0282873 A1 | 12/2006 | Zalewski et al. | |
| 2006/0287084 A1 | 12/2006 | Mao et al. | |
| 2006/0287085 A1 | 12/2006 | Mao et al. | |
| 2007/0025562 A1 | 2/2007 | Zalewski et al. | |
| 2007/0060336 A1 | 3/2007 | Marks et al. | |
| 2008/0100825 A1 | 5/2008 | Zalewski | |
| 2010/0033427 A1* | 2/2010 | Marks et al. | 345/156 |
| 2010/0128892 A1* | 5/2010 | Chen et al. | 381/92 |

OTHER PUBLICATIONS

Bolt, R.A., "Put-that-there": voice and gesture at the graphics interface, Computer Graphics, vol. 14, No. 3 (ACM SIGGRAPH Conference Proceedings) Jul. 1980, pp. 262 270.

DeWitt, Thomas and Edelstein, Phil, "Pantomation: A System for Position Tracking," Proceedings of the 2nd Symposium on Small Computers in the Arts, Oct. 1982, pp. 61-69.

Dietrich. "Real Time Animation Techniques with Microcomputers," 1982, 1 pg.

International Search Report and Written Opinion for Application No. PCT/US2011/062657 dated Feb. 23, 2012, 7 pages.

\* cited by examiner

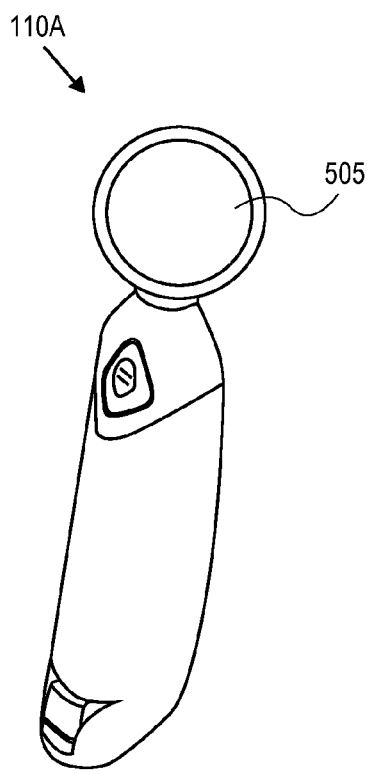 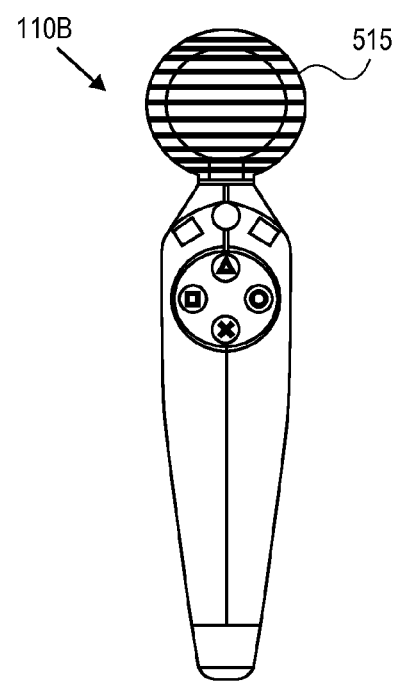
FIG. 5A    FIG. 5B

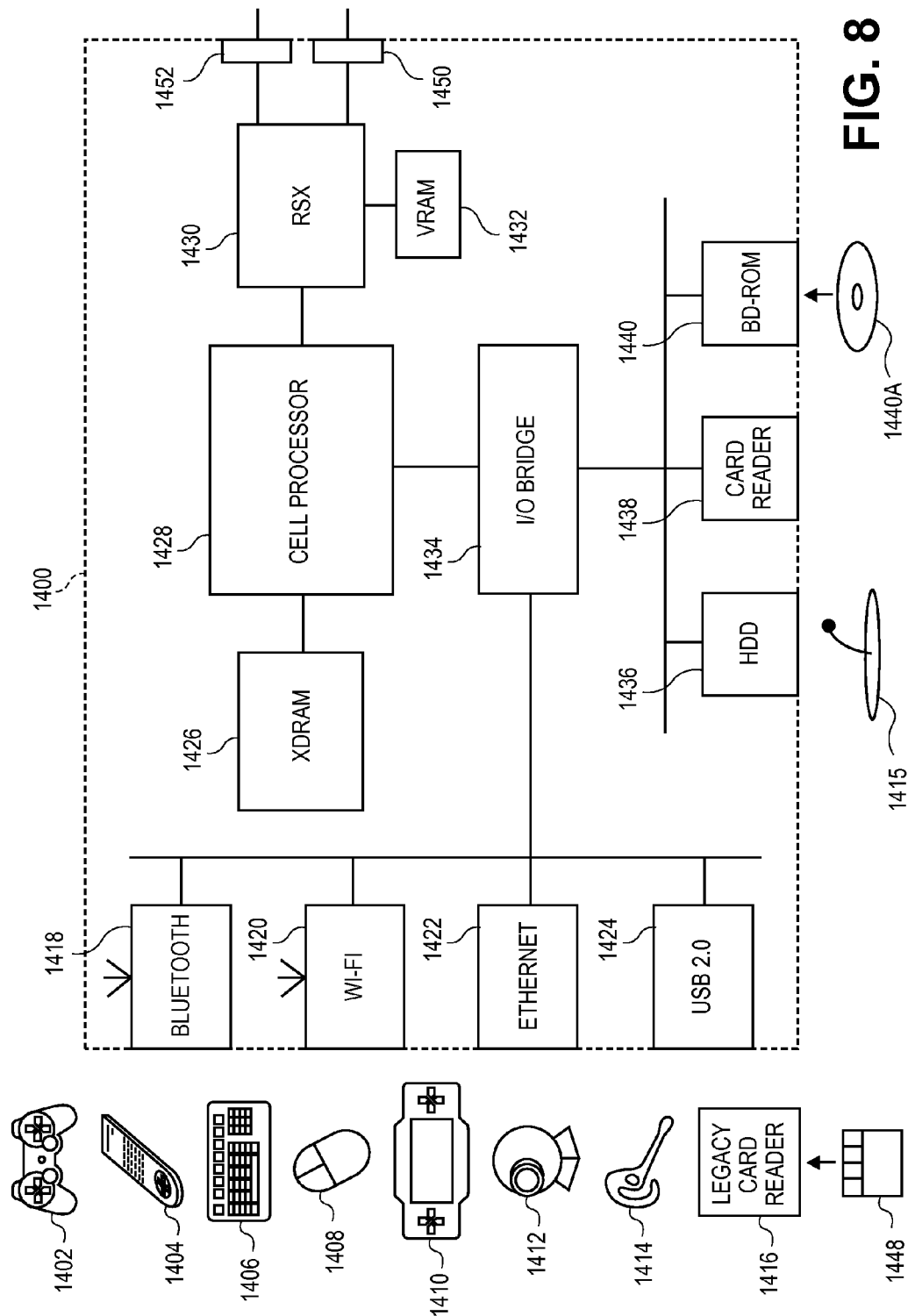

MICROPHONE ARRAY STEERING WITH IMAGE-BASED SOURCE LOCATION

CROSS REFERENCE TO RELATED APPLICATIONS

This application is related to U.S. patent application Ser. No. 11/302,511, filed Dec. 12, 2005, and titled "METHODS AND SYSTEMS FOR ENABLING DEPTH AND DIRECTION DETECTION WHEN INTERFACING WITH A COMPUTER PROGRAM" and related to U.S. patent application Ser. No. 11/381,721, filed May 4, 2006, and titled "METHODS AND APPARATUS FOR TARGETED SOUND DETECTION AND CHARACTERIZATION," the disclosures of each incorporated herein by reference in their entirety for all purposes.

This application is also related to U.S. patent application Ser. No. 11/418,989, filed Dec. 14, 2006, and titled "METHODS AND APPARATUS FOR CAPTURING AUDIO SIGNALS BASED ON A VISUAL IMAGE," the disclosure of which is incorporated herein by reference in the entirety for all purposes.

FIELD

The present invention relates to microphone array steering and more particularly to the steering an array based on positional information determined for a tracked object.

DESCRIPTION OF RELATED ART

Many computer platform applications utilize listening devices to detect sound. A microphone is typically utilized as a listening device to detect sounds for use in conjunction with these applications. Microphones are typically configured to detect sounds from a fixed area. Often, unwanted background noises are also captured by these listening devices so that the resultant audio signal is degraded and more difficult to use with the applications and associated computer platforms.

Microphone arrays are useful for improving the quality of received audio by focusing on an audio source and eliminating interfering signals. Arrays are particularly useful for far-field microphones, positioned at more than an arm's length from the audio source. Conventional techniques to steer a microphone array to a particular direction generally rely on information about how a signal arrives to the different microphones of the array. However, detection of the location of a source to which the array reception is to be steered is one of the most challenging aspects of focusing on an audio signal and becomes all the more challenging when a source dynamically changes position.

Prior techniques addressing the problem of localizing an audio source have relied on large and complex microphone arrays (e.g., with a 3D microphone geometry) and even then, the estimation is noisy and inaccurate due, in part, to physical limitations (e.g., beam angle separation, etc.). Therefore, audio quality from far-field arrayed microphones often suffers to an extent that it is unsuitable for advanced signal processing applications, such as speech recognition.

BRIEF DESCRIPTION OF THE DRAWINGS

Embodiments of the invention are particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

FIGS. 5A and 5B illustrate game controllers having a ball section which may be tracked based on visual image data, in accordance with one embodiment of the present invention;

FIG. 8 illustrates hardware and user interfaces that may be used to adapt a display, in accordance with one embodiment of the present invention.

Figure 1:
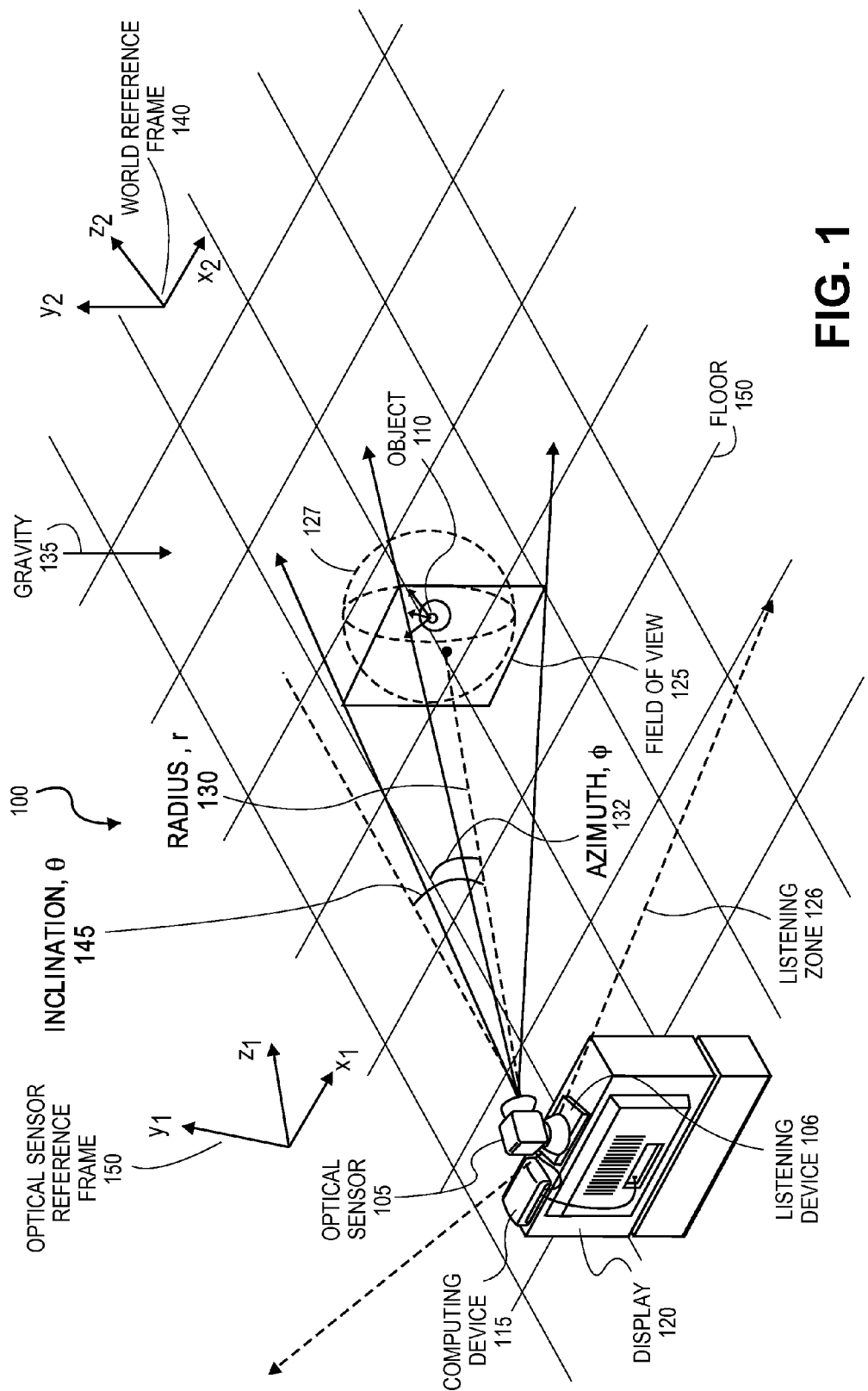
FIG. 1 illustrates an isometric view of a audio beam forming system in which positional information determined from at least visual image data is used to focus a microphone array, in accordance with an embodiment.

For clarity of illustration, elements illustrated in the figures have not necessarily been drawn to scale. Further, where considered appropriate, reference numerals have been repeated among the figures to indicate corresponding or analogous elements.

DETAILED DESCRIPTION

Described herein are methods and systems for filtering audio signals based on positional information determined from at least visual image data. Embodiments employ positional data determined from an image-based object tracking system in beam forming of an audio signal received with a microphone array. In an embodiment, positional information is determined through video analysis of a visual frame(s) containing an object, for example, a game motion controller. An audio filter is then to remove sound sources outside of a zone co-located with the tracked object. In certain embodiments, audio quality is improved for a target sound source, for example, a user holding the object, such that a far-field microphone having a fixed position may be utilized for purposes typically reserved for near-field microphones (e.g., speech recognition, etc.).

While numerous specific details are set forth in order to provide a thorough understanding of embodiments of the invention, it will be understood by those skilled in the art that other embodiments may be practiced without these specific details. In other instances, well-known methods, procedures, components and circuits have not been described in detail so as not to obscure the present invention. Some portions of the description herein are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm, as used herein, is a self-consistent sequence of actions or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated or otherwise as apparent from the following discussion, it is to be appreciated that throughout the description, discussions utilizing terms such as "processing", "computing", "converting", "reconciling", "determining" or "identifying," refer to the actions and processes of a computer platform which is an electronic computing device that includes a processor which manipulates and transforms data represented as physical (e.g., electronic) quantities within the processor's registers and accessible platform memories into other data similarly represented as physical quantities within the computer platform memories, processor registers, or display screen.

A computer program may be stored in a computer readable storage medium, such as, but not limited to, any type of disk including floppy disks, optical disks (e.g., compact disc read only memory (CD-ROMs), digital video discs (DVDs), Blu-Ray Discs™, etc.), and magnetic-optical disks, read-only memories (ROMs), random access memories (RAMs), EPROMs, EEPROMs, magnetic or optical cards, or any other type of non-transitory media suitable for storing electronic instructions.

The terms "coupled" and "connected," along with their derivatives, may be used herein to describe structural relationships between components of the apparatus for performing the operations herein. It should be understood that these terms are not intended as synonyms for each other. Rather, in particular embodiments, "connected" may be used to indicate that two or more elements are in direct physical or electrical contact with each other. "Coupled" may be used to indicated that two or more elements are in either direct or indirect (with other intervening elements between them) physical or electrical contact with each other, and/or that the two or more elements co-operate or communicate with each other (e.g., as in a cause an effect relationship).

FIG. 1 illustrates an isometric view of an audio beam forming system 100 in which positional information determined from at least visual image data is used to focus or steer a microphone array, in accordance with an embodiment. In the exemplary embodiment described in detail herein, the audio beam forming system 100 is a component of a gaming system. Alternatively, the audio beam forming system 100 may be a component of a motion capture system which may be utilized in many capacities, such as, but not limited to security systems and communications systems.

The audio beam forming system 100 includes a computing device 115 coupled to a display screen 120. The computing device 115 includes a computer processor and is at least responsible for generating output on the display screen 120 and may further perform one or more of: image analysis for object position tracking and audio signal processing for filtering of audio signals, as described herein. The computing device 115 may be specially constructed for the required purposes, or it may comprise a general purpose computer selectively activated or reconfigured by a computer program stored in the computer. In one embodiment, computing device 115 is a game console (e.g., a Sony Playstation® or the like) with the display screen 120 being any conventional display (e.g. LCD, OLED, CRT, etc).

The audio beam forming system 100 further includes an optical sensor 105 which collects visual image data for a field of view (FOV) 125. The FOV 125 is the angular extent of a given scene imaged in a frame of the optical sensor 105. Examples of wired connections include connections made via an IEEE 1394 (firewire) cable, ethernet cable, a universal serial bus (USB) cable, high definition media interface (HDMI), etc. Examples of wireless connections include wireless fidelity (WiFi™) connections, Bluetooth® connections, Zigbee® connections, and the like. In the illustrated embodiment, optical sensor 105 is connected with computing device 115 via a wired connection with the optical sensor 105 at a fixed positioned (e.g., on top of the display screen 120). In one embodiment, the optical sensor 105 is a standard definition or high definition (HD) video camera.

The audio beam forming system 100 is to analyze a visual image capture of an object 110 contained within the FOV 125 to determine the location of the object 110. Thus, based on the visual image data from the optical sensor 105, the object 110 will be identified, for example through execution of pattern recognition algorithms and a position of the object 110 determined as a function of time (e.g., real time). A typical distance for good image recognition is about 10 ft (3 mtr). In one embodiment, the location of the object 110 is defined by positional information, which in polar coordinates includes the radius r (130), the inclination angle θ (131), and azimuth angle φ (132). For example, the optical sensor 105 may capture depth information (radius (r) 130 between the optical sensor 105 and the object 110) based on predefined information that identifies a size of the object 110 and/or based on predefined information that identifies the FOV 125 of the optical sensor 105. As the object 110 is moved further from the optical sensor 105 (that is, as the radius (r)130 is increased), an image of the object 110 as captured by the optical sensor 105 becomes smaller. The radius 130 of the object 110 to the optical sensor 105 is therefore determinable based on a ratio of the image size of the tracked object 110 (e.g., as measured in pixels) to a known actual size of the tracked object 110 provided that the FOV 125 of the optical sensor 105 is known. In other embodiments, the optical sensor 105 is a Z-camera (a single lens video camera capable of capturing video with depth information) or a stereo camera (video camera with 2 or more lenses that can capture three-dimensional images). For such embodiments, the optical sensor 105 can capture depth information without being preconfigured with information identifying a size of the object 110.

In one embodiment where the object 110 is a user of the audio beam forming system 100, head tracking is completed with a combination of a template matching (for speed performance), coupled to a face detection code which identified the location of the user's face based on eyes and other facial features. For additional information on head and face detection, reference may be made to U.S. patent application Ser. No. 10/663,236.

In an embodiment, the object 110 is part of the audio beam forming system 100 and may have attributes facilitating its identification via the image data provided by the optical sensor 105. The object 110 may be at least a portion of a user input device to, or controller of, the computing device 115 via a wired or wireless connection. FIGS. 5A and 5B illustrate exemplary game controllers 110A and 110B, each having a ball section which may be tracked based on visual image data. Such controllers are commercially available as the Sony Playstation® Move motion controllers. In FIG. 5A, the game controller 110A has a ball section 505 while in FIG. 5B, the game controller 110B has a ball section 515. In certain embodiments, the ball sections 505 and 515 correspond to object 110 of FIG. 1.

The ball sections 505, 515 can be of different colors, and in one embodiment, the ball sections 505, 515 can light up. Although a spherical ball section is illustrated, the ball sections 505, 515 can have other shapes for visual tracking purposes, such as a partial sphere, an imperfect sphere, an elongated ball, a cube-like shape, etc.

In further embodiments, the object 110 (e.g., game controller 110A of FIG. 5A) includes one or more inertial sensors that have a fixed position within the object 110. In one embodiment, the inertial sensors include one or more gyroscopes and one or more accelerometers (e.g., MEMs) to detect changes in orientation (e.g., changes in pitch, roll and twist, all of which referred to herein generically as γ) of the object 110 and measure accelerations along one or more axes. The changes in orientation, γ, may further be included as positional information in a beam forming algorithm.

In certain embodiments where the audio beam forming system 100 includes the object 110, such as a game controller, visual tracking of the object 110 facilitated by the object 110 may be employed along with face detection code in a manner which utilizes the position of the object 110 to determine the location of the user's face based on eyes and other facial features. Positional information describing the location of the user's face is then employed for the audio beam forming described herein.

Returning to FIG. 1, the audio beam forming system 100 includes a listening device 106. In an embodiment, the listening device 106 includes a plurality of microphones forming a microphone array. Each microphone may be an omni-directional microphone such that the listening device 106 has a wide listening zone 126 (considerably larger than the FOV 125). While the plurality of microphones may include any number of microphones arranged in any geometry (e.g., 1-D, 2-D, and 3-D arrays), in the exemplary embodiment depicted in FIG. 4A, a microphone array 402 includes four microphones $M_0$, $M_1$, $M_2$, and $M_3$ spaced apart in a first dimension, for example, along the $x_1$ or $x_2$ dimension illustrated in FIG. 1. For one embodiment where the listening device 106 and the optical sensor 105 are part of a same video camera, the microphones $M_0$, $M_1$, $M_2$, and $M_3$ may share the optical sensor reference frame 150 with the optical sensor 105, so that the azimuth φ 132 is equal to φ in FIG. 4A ($M_0$, $M_1$, $M_2$, and $M_3$ arrayed along the $x_1$ axis). In other embodiments, the listening device 106 and the optical sensor 105 may be part of a same video camera, but the listening device 106 is part of a fixed base and the optical sensor 105 is rotatable in any of X, Y, Z directions relative to the listening device 106, or the listening device 106 and the optical sensor 105 are wholly separate and independent components. For either of those embodiments, the microphones $M_0$, $M_1$, $M_2$, and $M_3$ may have a different frame of reference than the optical sensor 105 (e.g., $M_0$, $M_1$, $M_2$, and $M_3$ arrayed along $x_2$) which is to be determined through a calibration routine so that positional information determined based on the optical sensor reference frame 150 may be applied to audio signals received by the listening device 106. For example, calibration routines for each of the optical sensor 105 and listening device 106 may be performed so a world reference frame 140 (defined as a reference frame that has an axis $y_2$ aligned with gravity 135) may be shared by the optical sensor 105 and the listening device 106.

Whether the object 110 is a part of the audio beam forming system 100 (e.g., as a game controller) or is a user of the audio beam forming system 100, the audio beam forming system 100 receives audio signals from the listening device 106 which, being disposed more than an arm's length away from the object 110 (e.g., about 10 ft (3 mtr)), functions in a far-field capacity. At least some component of the positional information (r, θ, φ, γ) determined by the audio beam forming system 100 for the object 110 by analyzing a visual image of the object 110 is to be related to the listening device 106 so that the audio signals generated by the microphone array 402 may be filtered as a function of the position of the object 110. In one embodiment, the filtering is to utilize a steering angle φ to emphasize an audio source most proximate to the object 110. Audio signal(s) at angles above and below a threshold about φ may be removed or cancelled to reference a target listening zone 127 to the object 110 (e.g., centered about the object 110). In other words, the audio signal may be "focused" from a larger listening zone (e.g., the listening zone 126) to a smaller listening zone (e.g., the target zone 127) based on the position of the object 110. Similarly, the audio signal may be "steered" based on the position of the object 110 by moving the target listening zone 127 in relation movement of the object 110. In other words, audio signal filtering utilizes a steering angle which is updated to follow the visually tracked object 110. It should be noted that while the exemplary embodiment entails emphasizing audio sources proximate to the object 110, similar techniques may achieve the opposite (e.g., to filter out, rather than filter in, audio sources proximate to the object 110).

Figure 2:
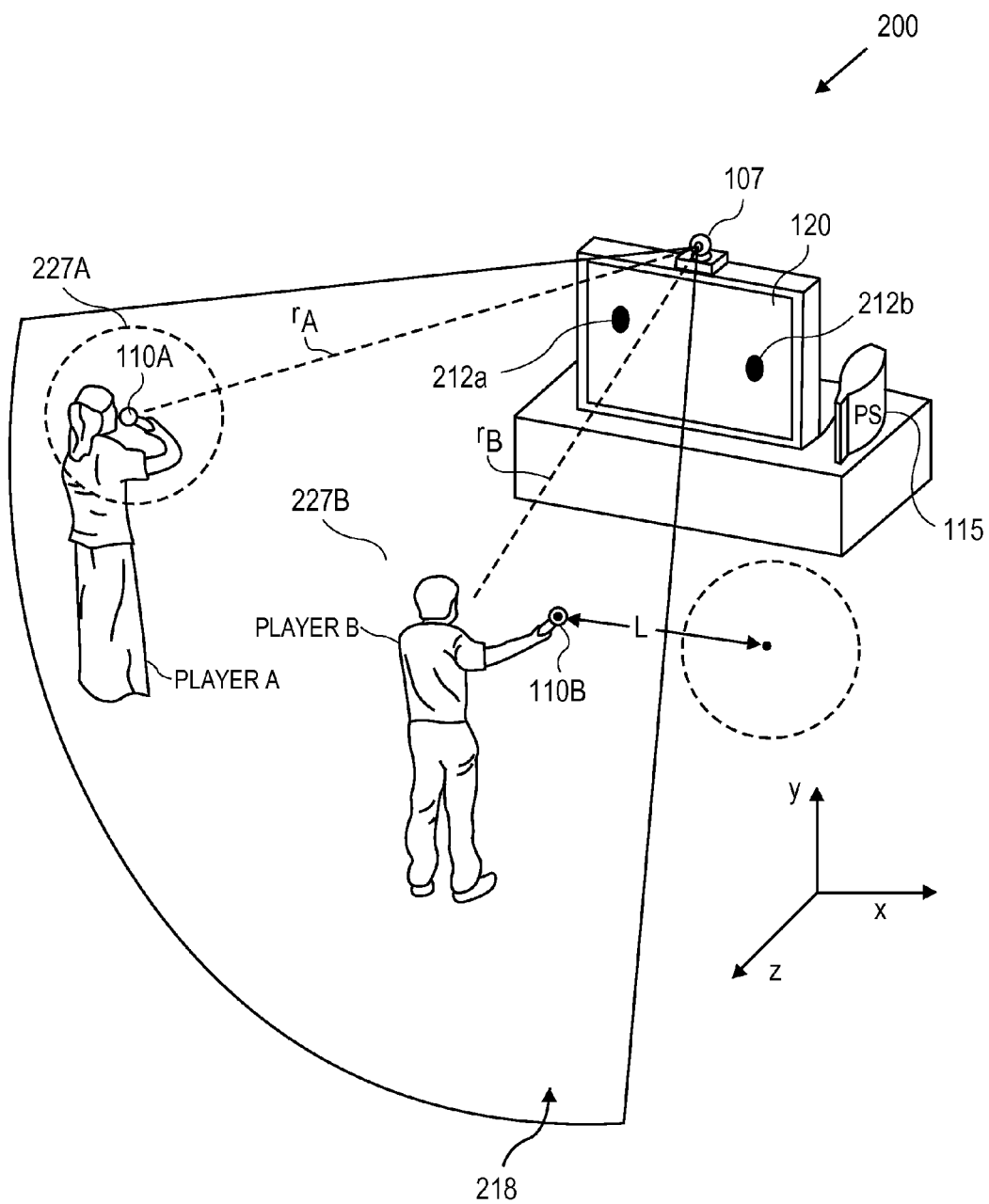
FIG. 2 illustrates an isometric view of a multiplayer environment, in which positional information determined from at least visual image data is used to filter audio signals in directions of different users, according to one embodiment.

FIG. 2 illustrates an isometric view of a multi-player environment, in which positional information determined from at least visual image data is used to beam form an audio signal in directions of different users, according to one embodiment. In the multi-player environment, an audio beam forming system 200 includes the same components described in the audio beam forming system 100 (FIG. 1), however with two objects, game controllers 110A and 110B. As shown, player A is associated with the game controller 110A and player B is associated with the game controller 110B. For the exemplary embodiment illustrated in FIG. 2, the audio beam forming system 200 includes the same number of microphones as did the audio beam forming system 100 (i.e., one listening device 106) where the game controllers 110A and 110B do not include integrated listening devices. For such embodiments, focusing of the far-field microphone array 204 may be used in the multi-player environment to emphasize either or both of the target listening zones 227A and 227B based on positional information determined for the game controllers 110A and 110B, respectively. Optical sensor 107 obtains an image of a playing field 218. The image is analyzed to obtain the location of game controllers 110A and 110B as defined with positional information vectors including $r_A$ and $r_B$, $\theta_A$ and $\theta_B$, $\phi_A$ and $\phi_B$. The positional information may be estimated by analyzing the shape and size of the respective game controllers in the captured image. From that positional information, the computing device 115 may produce representations of the players in display screen 120 (avatars 212a and 212b, respectively) and audio signal processing may be executed to control the target listening zones 227A and 227B. Thus, although it may be very difficult to reliably track player A as a sound source based on audio processing only, when player A passes in front of (or behind) player B, the use of visual object tracking greatly improves the audio beam forming by removing the problem of detection.

In further embodiments, audio signal processing may be executed in a manner further dependent on changes in orientation of a tracked object. For example, a audio steering angle may be offset from a visually determined position of the tracked object in response to a change in object orientation, as represented in FIG. 2 by the listening zone 227B being offset from the game controller 110B by length L based on a γ component of the positional information.

In further embodiments, steering of the audio signal(s) may occur based on a state of the game executing on the computing device 115 or on a state of the game controllers 110A and 110B. For example, where game play alternates between the player A and the player B, the audio beam forming system 200 may perform the audio processing based on a selected object to alternate between the target listening zone 227A and target listening zone 227B. As another example, each of the game controllers 110A and 110B may have a user-activated button which changes the state of the game controller to invoke audio signal processing which will focus the listening zone to be centered about the game controller, thereby providing a virtual near-field microphone for each user.

Figure 3:
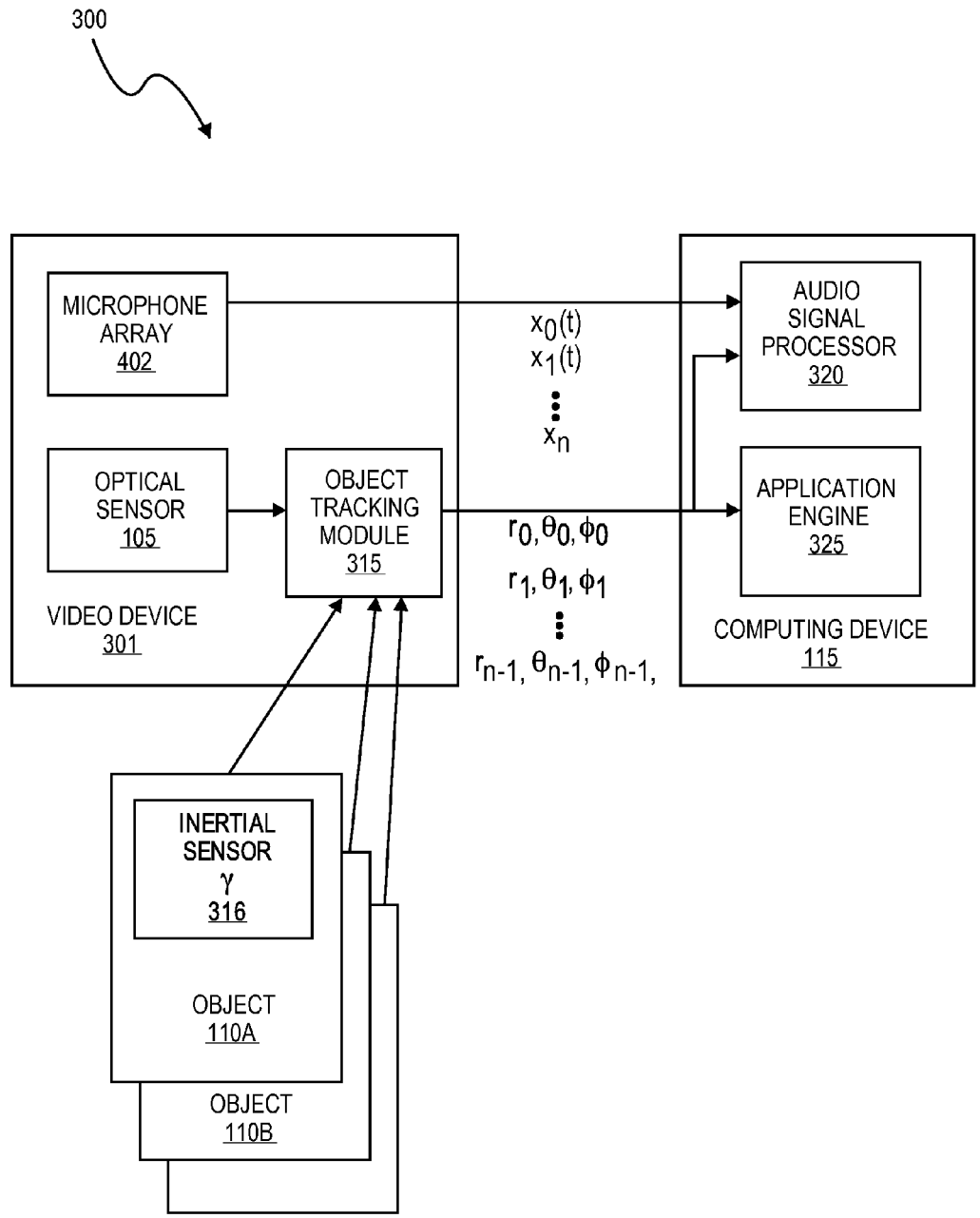
FIG. 3 illustrates a block diagram of functional modules of a audio beam forming system, in accordance with an embodiment.
Figure 6:
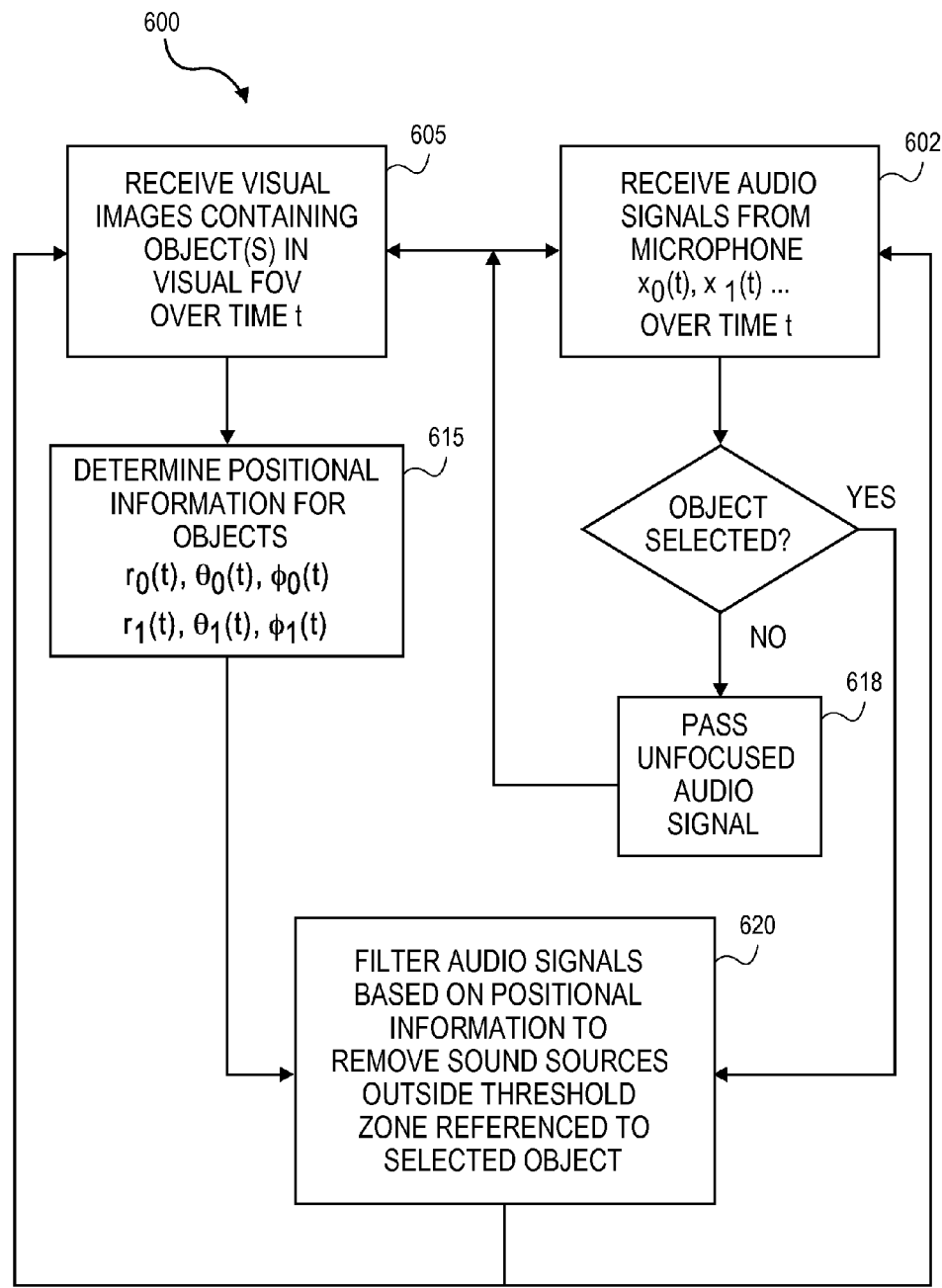
FIG. 6 is a flow diagram of an exemplary method of focusing audio signals based on positional information determined from at least visual image data, in accordance with an embodiment.

FIG. 3 illustrates a block diagram of functional modules of an audio beam forming system 300, in accordance with an embodiment. FIG. 6 is a flow diagram of an exemplary method of filtering audio signals based on positional information determined from at least visual image data, which may be executed by the audio beam forming system 300, in accordance with an embodiment.

Referring first to FIG. 6, at operation 605 visual images containing objects in the FOV are collected over time by, for example by a video device 301 (FIG. 3).

At operation 602, audio signals from the microphone array are generated over time, for example by the microphone array 402 (FIG. 3). As further depicted in FIG. 3, the microphone array 402 outputs an audio signal vector $x=[x_0, x_1, x_2, x_3]$, where $x_0, x_1, x_2$ and $x_3$ are the time domain signals received generated the microphones $M_0, M_1, M_2$ and $M_3$, respectively, for the sound arriving from one or more sources 404.

At operation 615 (FIG. 6), object positional information over time for each object 110 (A, B, etc.) is generated from received image data (frames) and inertial data received from inertial sensor 316. As further shown in FIG. 3, for example, an array $\{(r_{A0}, \theta_{A0}, \phi_{A0}, \gamma_{A0}), (r_{B0}, \theta_{B0}, \phi_{B0}, \gamma_{B0}) (r_{A1}, \theta_{A1}, \phi_{A1}, \gamma_{A1}), (r_{B1}, \theta_{B1}, \phi_{B1}, \gamma_{B1}), \ldots\}$ may be output by the object tracking module 315 over time for tracked objects 100A, 110B, etc. In the exemplary embodiment depicted, the object tracking module 315 is a component of the video device 301 for provisioning as an accessory/upgrade to the computing device 115. Nonetheless, in other embodiments, the object tracking module 315 is a component of the computing device 115. The positional information output from the object tracking module 315 is provided to a coupled application engine 325 (for update of rendered graphical objects, etc.) as well as to the communicatively coupled audio signal processor 320.

Depending on whether any object (e.g., object 110A, 110B, etc. of FIG. 3) is selected to provide a positional basis for audio beam forming, received audio signals are either passed through at operation 618 (FIG. 6) without spatial filtering based on a tracked object position, or are filtered based on a tracked object's positional information at operation 620.

Figure 4A:
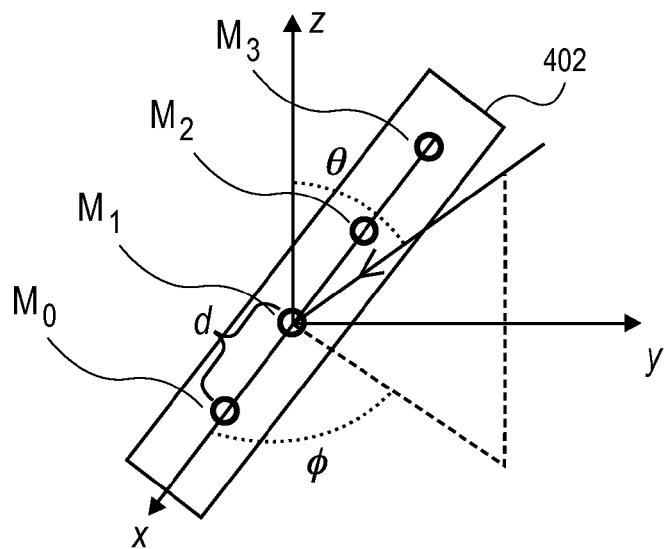
FIGS. 4A and 4B are schematic diagrams illustrating a microphone array for providing an audio signal for steering based on positional information determined from at least visual image data, according to one embodiment.
Figure 4B:
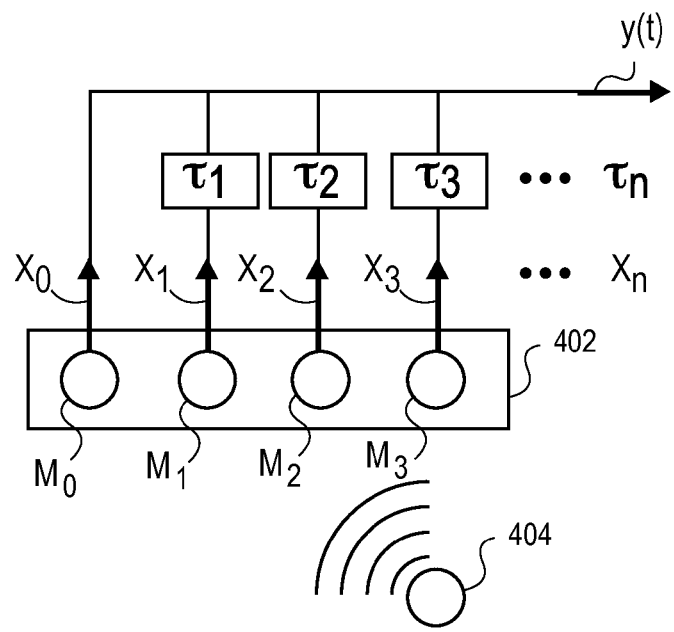

Generally the filtering of the audio signal at 620 may be done in any manner known in the art which will accommodate an input of at least one component of the positional information (e.g., r, θ, φ, γ) for defining a steering angle (e.g., φ). The filtering is to separate sound sources and either emphasize (focus) or deemphasize sources referenced to the position of the tracked object 110 (e.g., within a listening zone contour threshold). Referring to FIGS. 4A and 4B, the received digital signal y(t) can be seen as a summation of the individual signals $x_n(t)$ received by each microphone. Due to the spatial distance d between microphones, there is a delay $\tau_n$ in the signal detected by each microphone (referenced to microphone $M_0$ in the depicted example). Thus, the received signal can be expressed as:

$$y(t) = \frac{1}{N-1} \sum_{n=0}^{N-1} x_n(t - \tau_n) \tag{1}$$

Assuming only steering on the φ direction (given θ=π/2). The phase of each incoming signal can be changed with:

$$\varphi_n = \frac{-2\pi f n d \cos\phi'}{c}, \tag{2}$$

where d is the distance between microphones, f is the frequency of the incoming signal, φ' is the angle towards which the steering is done, and c is speed of propagation of the wave in a given medium. A similar expression using a sin( ) function may be similarly derived.

The directivity pattern is a function of the frequency of the incoming signal and the steering angle:

$$D(f, \phi) = \frac{1}{N-1} \sum_{n=0}^{N-1} e^{j\frac{2\pi f n d(\cos\phi - \cos\phi')}{c}}, \tag{3}$$

which may be implemented by adding phase delays of the following form to the signal from each microphone:

$$\tau_n = \frac{n d \cos\phi'}{c} \tag{4}$$

However, equations (1)-(4) are generally limited to the "narrowband" case where the bandwidth of the signal is narrow enough that the signals received at the opposite ends of the microphone array 402 are still well-correlated to each other. In embodiments where the beam forming systems described herein are incorporated in to gaming systems, this cannot be guaranteed. For example, in the exemplary embodiment illustrated in FIG. 2, the size of the listening device 106 is such the bandwidth of the voice signal is broader than the microphone array (e.g., microphone array 402) and the microphone array will not receive a planar wavefront as typically assumed in many array processing techniques. Therefore, in certain embodiments, wideband beam forming algorithms are performed by the audio signal processor 320.

Figure 7A:
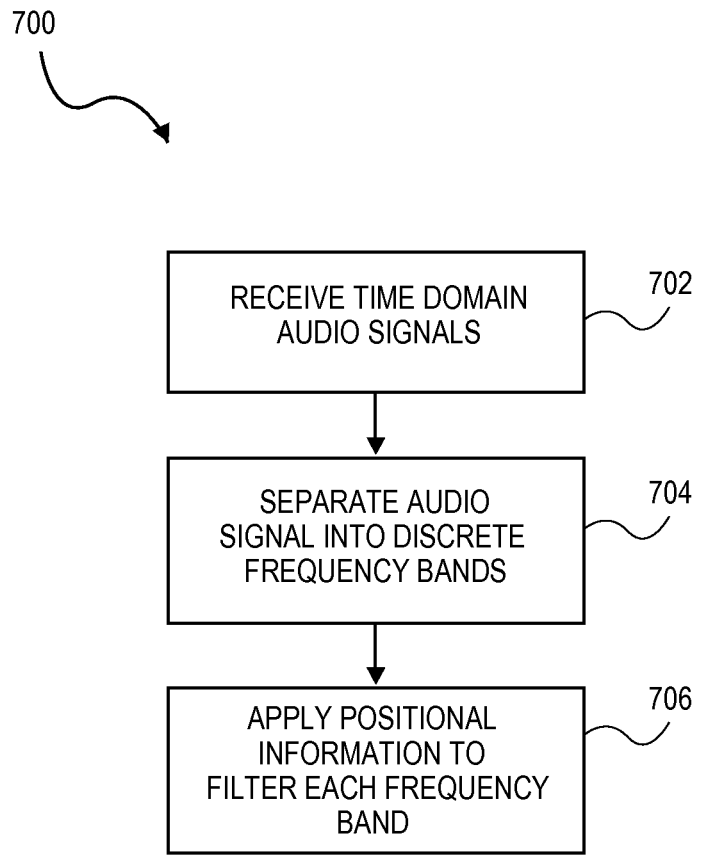
FIG. 7A is a flow diagram of an exemplary wideband beam forming method based on positional information determined from at least visual image data, in accordance with an embodiment.

FIG. 7A is a flow diagram of an exemplary wideband beam forming method based on positional information determined from at least visual image data, in accordance with an embodiment. For wideband beam forming embodiments, pre-determined intervals, e.g., about every 8 milliseconds, of the recorded voice signal y(t) is formed into analysis frames at operation 702. The signal is then transformed from the time domain into the frequency domain at operation 704, e.g., by taking a Fourier transform, and the resulting equation may be solved for the frequency domain output signal Y(N). This is equivalent to performing a Fourier transform (e.g., with a fast Fourier transform (fft)) for J+1 frames where each frequency bin in the Fourier transform is a (J+1)×1 column vector. The number of frequency bins is equal to N+1 and each bin sized to have a bandwidth suitable to be treated as a narrowband signal.

Figure 7B:
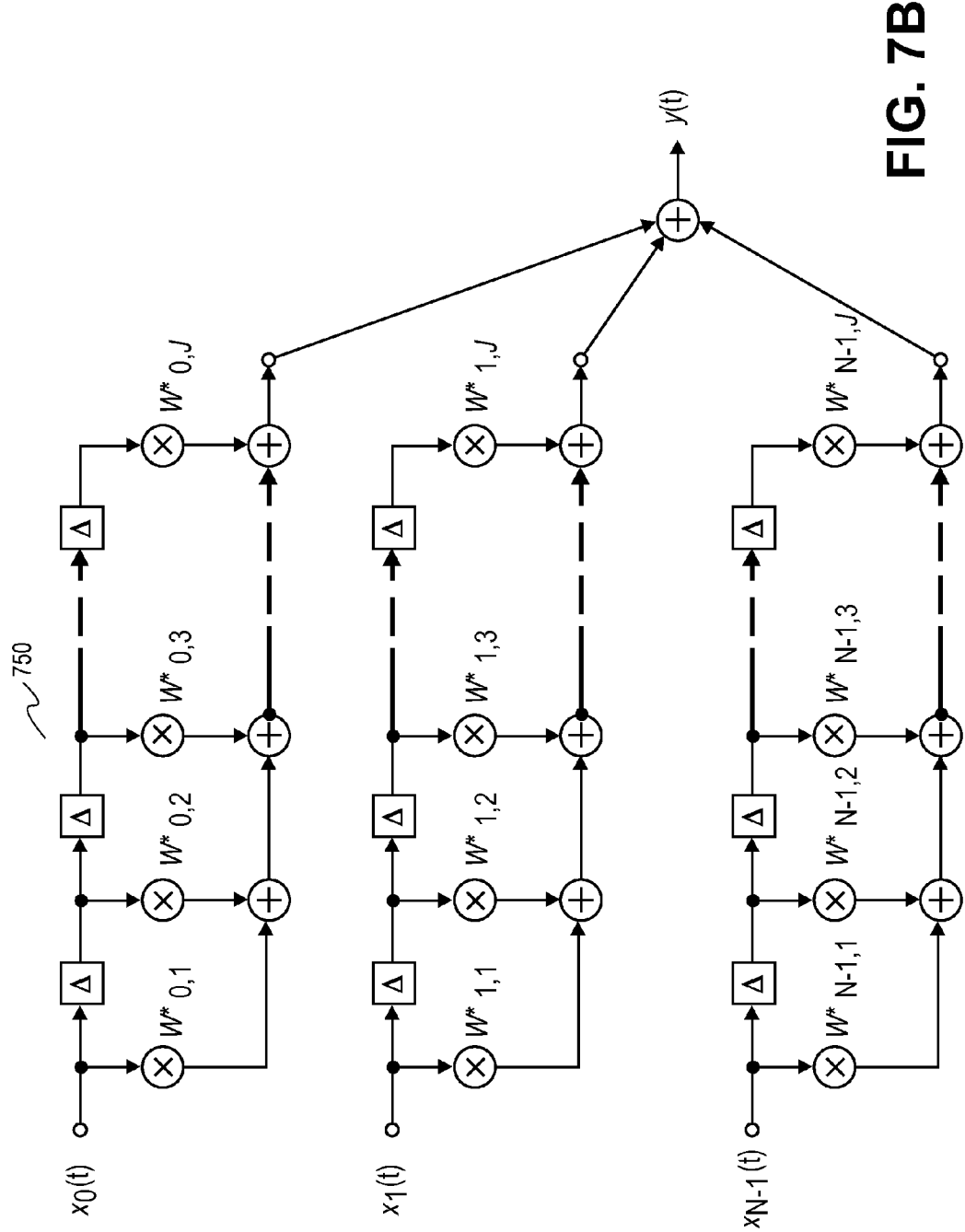
FIG. 7B illustrates an audio signal filtering model, in accordance with an embodiment.

At operation 706 positional information received (e.g., from operation 615) is utilized to apply a series of delays to the incoming signals such that the beam forming is performed over the plurality of frequency bins. A bank of filters is used to compensate the phase difference of every signal received in the microphone for the different frequency components. For such embodiments, the received signal may be described as:

$$y(t) = \frac{1}{N-1} \sum_{n=0}^{N-1} \sum_{i=1}^{J} x_n(t - iT_s) \times w_{n,i}^* , \quad (5)$$

where J is the number of delay elements associated to each of n microphones. The set of $w^*_{n,i}$ are the coefficients of a Finite Impulse Filter or Infinite Impulse Filter that divides the incoming signal in J frequency bins, and $T_s$ are the delays between adjacent elements of the filter. FIG. 7B illustrates an exemplary filter 750 where Δ represents the delays applied in the elements that compose the filters and $w^*_{n-1,i}$ are the set of weights of the filters. The filter 750 may be implemented (e.g., by the audio signal processor 320) in hardware or software or a combination of both hardware and software. Filter coefficients for each microphone and each frequency bin i, may be computed from the input signals $x_{n-1}(t)$ that best separate out a source of sound referenced to the position of the tracked object 110 and portions of the audio signal originating from outside of the object-referenced listening zone removed. In other embodiments, filter coefficients are computed for steering the audio signal from a first position toward a second position as the object 110 moves or as different objects are selected.

In further embodiments, to avoid spatial and frequency aliasing, the filters employed at operation 706 are designed so the following condition is satisfied:

$$2\pi f \tau_n = \frac{nd\cos\phi}{c} \quad (6)$$

Thus, method 700 generates a filter that is suitable to separate the frequency components of the incoming wideband voice signal with the filter updated periodically with the most recently determined position information for a tracked object. For example, for each new reading of the position of the object 110 at operation 615, a new steering angle (e.g., ϕ) is computed and with that steering angle, the coefficients of the filter are updated.

FIG. 8 further illustrates hardware and user interfaces that may be used to adapt a display based on eye tracking, in accordance with one embodiment of the present invention. FIG. 8 schematically illustrates the overall system architecture of the Sony® Playstation® 3 entertainment device, a console that may be compatible for implementing the adaptive display methods described herein. A platform unit 1400 is provided, with various peripheral devices connectable to the platform unit 1400. The platform unit 1400 comprises: a Cell processor 1428; a Rambus® dynamic random access memory (XDRAM) unit 1426; a Reality Simulator graphics unit 1430 with a dedicated video random access memory (VRAM) unit 1432; and an I/O bridge 1434. The platform unit 1400 also comprises a Blu Ray® Disk BD-ROM® optical disk reader 1440 for reading from a disk 1440A and a removable slot-in hard disk drive (HDD) 1436, accessible through the I/O bridge 1434. Optionally the platform unit 1400 also comprises a memory card reader 1438 for reading compact flash memory cards, Memory Stick® memory cards and the like, which is similarly accessible through the I/O bridge 1434.

The I/O bridge 1434 also connects to multiple Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controller 1402. For example when a user is playing a game, the I/O bridge 1434 receives data from the game (motion) controller 1402 via a Bluetooth link and directs it to the Cell processor 1428, which updates the current state of the game accordingly.

The wireless, USB and Ethernet ports also provide connectivity for other peripheral devices in addition to game controller 1402, such as: a remote control 1404; a keyboard 1406; a mouse 1408; a portable entertainment device 1410 such as a Sony Playstation® Portable entertainment device; a video image sensor such as an Playstation® Eye video image sensor 1412; a microphone headset 1414; a microphone array 1415. Such peripheral devices may therefore in principle be connected to the platform unit 1400 wirelessly; for example the portable entertainment device 1410 may communicate via a Wi-Fi ad-hoc connection, while the microphone headset 1414 may communicate via a Bluetooth link.

The provision of these interfaces means that the Playstation 3 device is also potentially compatible with other peripheral devices such as digital video recorders (DVRs), set-top boxes, digital video image sensors, portable media players, Voice over IP telephones, mobile telephones, printers and scanners.

The game controller 1402 is operable to communicate wirelessly with the platform unit 1400 via the Bluetooth link, or to be connected to a USB port, thereby also providing power by which to charge the battery of the game controller 1402. Game controller 1402 can also include memory, a processor, a memory card reader, permanent memory such as flash memory, light emitters such as LEDs or infrared lights, microphone and speaker, a digital video image sensor, an internal clock, a recognizable/identifiable shape such as a spherical section facing the game console, and wireless communications using protocols such as Bluetooth®, WiFi™, etc.

Game (motion) controller 1402 is a controller designed to be used with two hands. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or the like.

The remote control 1404 is also operable to communicate wirelessly with the platform unit 1400 via a Bluetooth link The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The platform unit 1400 is operable to supply audio and video, either generated or decoded by the Playstation 3 device via the Reality Simulator graphics unit 1430, through audio and video connectors to a display and sound output device such as, the display 120. The audio connectors 1450 may include conventional analogue and digital outputs while the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

In one embodiment, the video image sensor 1412 comprises a single charge coupled device (CCD) and an LED indicator. In some embodiments, the sensor 1412 includes software and hardware-based real-time data compression and encoding apparatus so that compressed video data may be transmitted in an appropriate format such as an intra-image based MPEG (motion picture expert group) standard for decoding by the platform unit 1400. The video image sensor LED indicator is arranged to illuminate in response to appropriate control data from the platform unit 1400, for example to signify adverse lighting conditions. Embodiments of the video image sensor 1412 may variously connect to the platform unit 1400 via an HDMI, USB, Bluetooth or Wi-Fi communication port. Embodiments of the video image sensor may include one or more associated microphones and may also be capable of transmitting audio data. In embodiments of the video image sensor, the CCD may have a resolution suitable for high-definition video capture. In use, images captured by the video image sensor may for example be incorporated within a game or interpreted as game control inputs. In another embodiment the video image sensor is an infrared video image sensor suitable for detecting infrared light.

Figure 9:
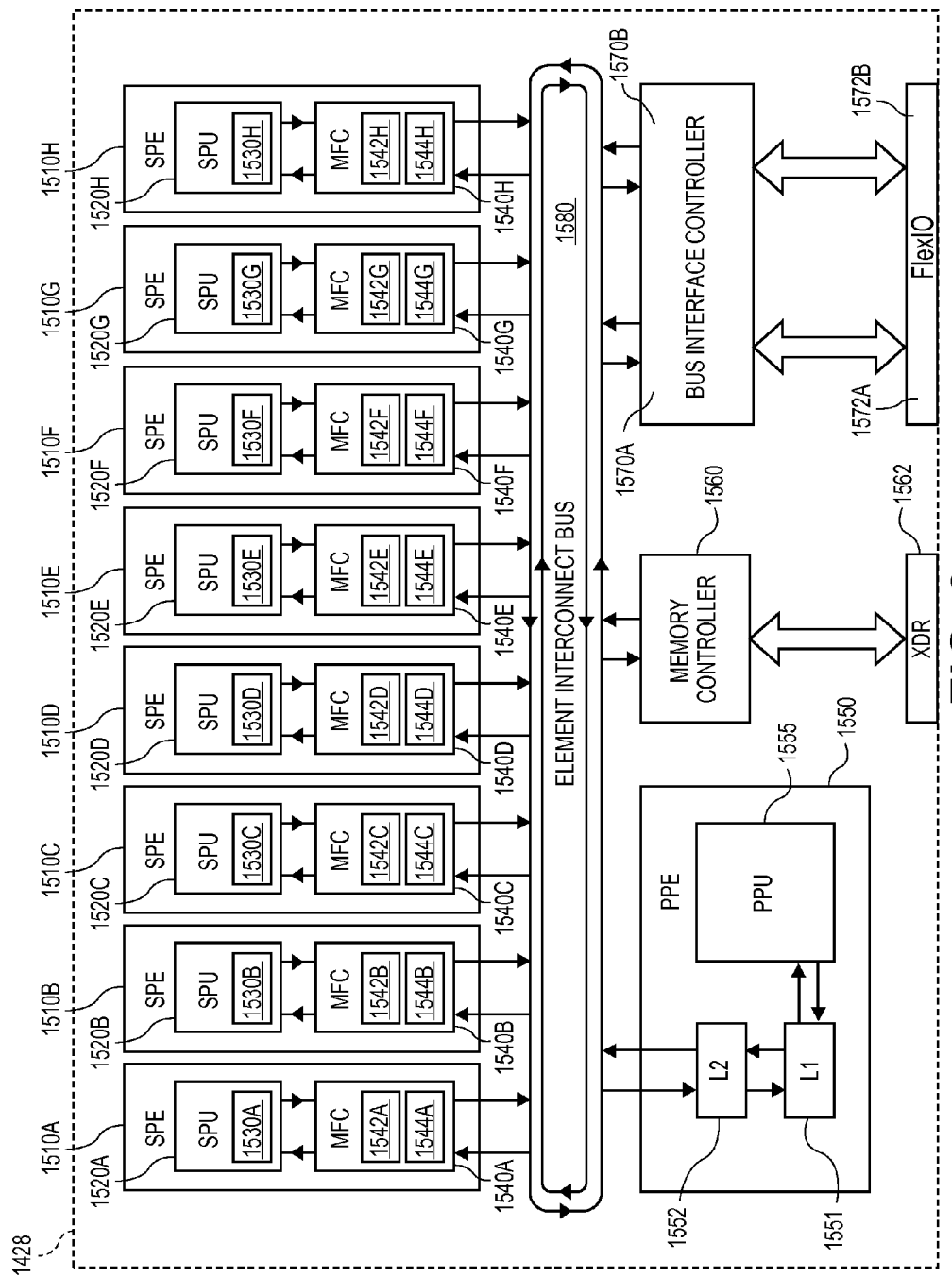
FIG. 9 illustrates additional hardware that may be used to process instructions, in accordance with one embodiment of the present invention.

FIG. 9 illustrates additional hardware that may be used to process instructions, in accordance with one embodiment of the present invention. Cell processor 1428 of FIG. 8, as further illustrated in FIG. 6, has an architecture comprising four basic components: external input and output structures comprising a memory controller 1560 and a dual bus interface controller 1570A, B; a main processor referred to as the Power Processing Element 1550; eight co-processors referred to as Synergistic Processing Elements (SPEs) 1510A-H; and a circular data bus connecting the above components referred to as the Element Interconnect Bus 1580. The total floating point performance of the Cell processor is 1428 GFLOPS, compared with the 6.2 GFLOPs of the Playstation 2 device's Emotion Engine.

The Power Processing Element (PPE) 1550 is based upon a two-way simultaneous multithreading Power 1470 compliant PowerPC core (PPU) 1555 running with an internal clock of 3.2 GHz. It comprises a 512 kB level 2 (L2) cache 1552 and a 32 kB level 1 (L1) cache 1551. The PPE 1550 is capable of eight single position operations per clock cycle, translating to 25.6 GFLOPs at 3.2 GHz. The primary role of the PPE 1550 is to act as a controller for the SPEs 1510A-H, which handle most of the computational workload. In operation the PPE 1550 maintains a job queue, scheduling jobs for the SPEs 1510A-H and monitoring their progress. Consequently each SPE 1510A-H runs a kernel whose role is to fetch a job, execute it and synchronized with the PPE 1550.

Each Synergistic Processing Element (SPE) 1510A-H comprises a respective Synergistic Processing Unit (SPU) 1520A-H, and a respective Memory Flow Controller (MFC) 1540A-H comprising in turn a respective Dynamic Memory Access Controller (DMAC) 1542A-H, a respective Memory Management Unit (MMU) 1544A-H and a bus interface (not shown). Each SPU 1520A-H is a RISC processor clocked at 3.2 GHz and comprising 256 kB local RAM 1530A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1520A-H does not directly access the system memory XDRAM 1426; the 64-bit addresses formed by the SPU 1520A-H are passed to the MFC 1540A-H which instructs its DMA controller 1542A-H to access memory via the Element Interconnect Bus 1580 and the memory controller 1560.

The Element Interconnect Bus (EIB) 1580 is a logically circular communication bus internal to the Cell processor 1428 which connects the above processor elements, namely the PPE 1550, the memory controller 1560, the dual bus interface controller 1570A, B and the 8 SPEs 1510A-H, totaling 12 participants. Participants can simultaneously read and write to the bus at a rate of 8 bytes per clock cycle. As noted previously, each SPE 1510A-H comprises a DMAC 1542A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96 B per clock, in the event of full utilization through arbitration between participants. This equates to a theoretical peak bandwidth of 307.2 GB/s (gigabytes per second) at a clock rate of 3.2 GHz.

The memory controller 1560 comprises an XDRAM interface 1378, developed by Rambus Incorporated. The memory controller interfaces with the Rambus XDRAM 1426 with a theoretical peak bandwidth of 25.6 GB/s.

The dual bus interface controller 1570A, B comprises a Rambus FlexIO® system interface 1572A, B. The interface is organized into 12 channels each being 8 bits wide, with five paths being inbound and seven outbound.

It is to be understood that the above description is intended to be illustrative, and not restrictive. For example, while the flow diagrams in the figures show a particular order of operations performed by certain embodiments of the invention, it should be understood that such order is not required (e.g., alternative embodiments may perform the operations in a different order, combine certain operations, overlap certain operations, etc.). Furthermore, many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. The scope of the invention should, therefore, be determined with reference to the appended claims, along with the full scope of equivalents to which such claims are entitled.

What is claimed is:

1. A method of focusing a microphone array, comprising:
receiving an audio signal from the microphone array, the microphone array disposed a distance away from a first component of an audio beam forming system;
receiving a visual image from a plurality of images forming a video segment from an optical image sensor having a known position relative to the microphone array, the visual image including the first component within a field of view (FOV);
determining positional information for the first component, relative to the microphone array by analyzing the visual image, and by determining a distance between the first component and the image sensor based on a predetermined size of the first component;
tracking a change in the position of the first component relative to the image sensor based on changes in the visual image within the video segment; and
filtering the audio signal to emphasize or de-emphasize audio sources proximate to the first component based on a beam forming algorithm that is a function of the positional information and on the change in the position of the first component.

2. The method of claim 1, wherein filtering the audio signal further comprises steering the audio signal from a first position to the position of the first component.

3. The method of claim 1, wherein filtering the audio signal further comprises removing portions of the audio signal originating from outside of a listening zone centered about the first component.

4. The method of claim 1, wherein analyzing the visual image further comprises:
identifying the first component with a pattern recognition algorithm; and
calculating a position of the first component relative to the optical image sensor.

5. The method of claim 4, wherein calculating a position of the first component relative to the optical image sensor further comprises determining a three dimensional vector that points from the optical axis to a center of the first component.

6. The method of claim 4, further comprising receiving a change in orientation of the first component, and wherein filtering the audio signal based on the determined position of the first component further comprises determining whether to offset an audio steering angle from the determined position of the first component based on the orientation change.

7. The method of claim 1, wherein filtering the audio signal based on the determined position of the first component further comprises:
transforming the received audio signal into the frequency domain;
separating the audio signal into discrete frequency bands; and
applying at least one component of the positional information to filter each of the frequency bands.

8. The method of claim 1, further comprising:
analyzing the visual image to determine the position of a second component of the audio beam forming system relative to the array; and
steering the audio signal from the first component toward the second component based on the determined position of the second component.

9. The method of claim 8, wherein the steering toward the second component further comprises removing portions of the audio signal originating from near the first component based on the determined position of the first component.

10. A non-transitory computer-readable medium having stored thereon a set of instructions, which when executed by a processing system, cause the processing system to perform the method of claim 1.

11. A system, comprising:
a computing platform;
a microphone array coupled to the computing platform to receive an audio signal; and
an optical image sensor coupled to the computing platform, wherein the computing platform further comprises:
an object tracking module to determine positional information for a first component and for a second component of an audio beam steering system relative to the microphone array by analyzing an image signal from the optical image sensor, the image signal including the first component and the second component within a field of view (FOV) of the image sensor; and
an audio signal processor to emphasize or de-emphasize audio sources proximate to the first component based on a beam forming algorithm that is a function of the positional information for the first component, and to steer the received audio signal from the first component to the second component based on the positional information for the second component.

12. The system as in claim 11, wherein the microphone array is integrated with the optical image sensor into a video camera disposed a distance away from the first component.

13. The system as in claim 12, wherein the object tracking module is to track a change in the positional information for the first component based on changes in the image signal within a video segment; and wherein the audio signal processor is to steer the received audio signal with filter coefficients generated based on the change in the positional information.

14. The system as in claim 11, wherein the audio signal processor is to:
transform the received audio signal into frequency domain;
separate the audio signal into discrete frequency bands; and
apply at least one component of the positional information to filter each of the frequency bands.

15. The system as in claim 11, wherein the system further comprises the first component, and wherein the first component is a first controller of the computing platform, includes one or more inertial sensors, and is to gather and transmit inertial data to the computing platform.

16. The system as in claim 15, wherein the audio signal processor is to filter the received audio signal with a steering angle offset from a determined position of the first component based on the inertial data.

17. The system as in claim 11, wherein the audio signal processor is to remove portions of the received audio signal originating from near the first component based on the positional information for the first component.

* * * * *